United States Patent Office 2,765,333
Patented Oct. 2, 1956

2,765,333

BIS(CYANOPENTENOXY)ALKANES AND THEIR PREPARATION

Earl W. Lane, Philadelphia, and Warren D. Niederhauser, Huntingdon Valley, Pa., assignors to Rohm & Haas Company, Philadelphia, Pa., a corporation of Delaware No Drawing. Application July 13, 1954,
Serial No. 443,154

10 Claims. (Cl. 260—465.6)

This invention relates to bis(cyanopentenoxy)alkanes as new compositions of matter. It also relates to a method for the preparation of the bis(cyanopentenoxy)alkanes.

The present reaction is concerned with bis(cyanopentenoxy)alkanes and with the preparation of bis(cyanopentenoxy)alkanes by reacting the corresponding bis(halopentenoxy)alkanes with a cyanide donor compound. The bis(cyanopentenoxy)alkanes may be represented by the formula $(CNCH_2CH=CHCH_2CH_2O)_2R$, in which R is an alkylene group of two to eight carbon atoms.

The present method involves the reaction between one mol of the bis(halopentenoxy)alkane, in which the halogen may be chlorine or bromine, and two mols of a cyanide donor compound to form a bis(cyanopentenoxy)alkane having the formula $$(CNCH_2CH=CHCH_2CH_2O)_2R$$

defined above, in substantially quantitative yields. Typical of the alkylene groups that may be employed as R are ethylene, propylene, isopropylene, butylene, isobutylene, pentylene, hexylene, isohexylene, heptylene, 1,1,2-trimethylpentylene, octylene, and the like. Either of the reactants may be in excess but it is usually preferable to supply the cyanide donor compound in slight excess.

The cyanide donor compound may be any compound that will donate a cyanide group to the bis(halopentenoxy)alkane in exchange for the halogen, under the present reaction conditions, to be more fully described hereinafter. Preferably the donor compound has an inorganic monovalent cation. Among the suitable cyanide donor compounds that may be employed are sodium cyanide, potassium cyanide, lithium cyanide, cuprous cyanide, hydrogen cyanide, and the like. Cuprous cyanide is particularly well suited for this use. The reaction proceeds quite satisfactorily by introducing hydrogen cyanide into a reaction mixture that includes a salt, such as a chloride, of sodium, potassium, lithium, monovalent copper, or the like. Nevertheless, the manner of providing the cyanide donor compound in the reaction mixture is largely a matter of convenience.

The bis(halopentenoxy)alkanes and the method of their preparation are disclosed in application Serial Number 443,152, filed July 13, 1954, in the hands of a common assignee.

The present reaction is preferably conducted in an inert solvent medium in order to maintain the reactants in intimate proximity and to assure maximum heat transfer benefits. Any compound that is a solvent for at least one of the reactants without reacting or otherwise interfering, i. e. inert, is considered to be satisfactory for this use. Among the solvents suitable for this use are water, methanol, ethanol, isopropanol, propanol, chloroform, ethylene dichloride, acetonitrile, and the like, and combinations thereof. It is frequently convenient to use two miscible solvents, one a solvent for the cyanide donor compound and the other a solvent for the bis(halopentenoxy)alkane. In any case the use of a solvent apparently facilitates the reactions and is therefore preferred.

The instant method is preferably conducted at temperatures in the range of 40° to 175° C., the preferred range being 55° to 140° C. The actual reaction temperature contemplated is largely a matter of convenience with somewhat accelerated performances observed in the preferred range set forth above. The reaction temperature may be influenced by the use of a solvent medium. Satisfactory results are generally obtained when the reaction is conducted at the atmospheric reflux temperature of the solvent medium. Of course, if reaction temperatures appreciably greater than the atmospheric reflux temperature of the solvent medium is anticipated then the use of pressures greater than atmospheric is indicated. The reaction proceeds quite favorably under the conditions of higher temperatures and elevated pressures. The instant reaction will occur above the temperatures set forth above but there is apparently no appreciable advantage gained at the higher temperature while there is the disadvantage that possible undesirable side reactions may occur. Hence, temperatures in the ranges set forth above are usually employed.

The time of reaction is not especially critical and generally varies according to the temperatures, pressures, solvents, and specific reactants concerned. Usually the reaction is substantially completed in about one to six hours or more, although longer periods of time are frequently employed to assure reaction completion. If desired, the completion of the reaction may be determined by titration procedures. Since the reaction produces, as a necessary by-product, an ionizable chloride whose quantitative amounts can be determined by titration methods, such as the Volhard method, an indication of reaction completion may be obtained. However, as a matter of convenience, instead of obtaining an indication of reaction completion by titration or other methods, the reaction is usually run for a period of time somewhat longer than that contemplated for the completion of the reaction in order to assure a substantially quantitative result.

At the conclusion of the reaction, after the bis(cyanopentenoxy)alkane has been formed, a compound that is a solvent for the product and yet is essentially immiscible with water, such as ethylene dichloride, chloroform, or the like, if not initially present, is added to the reaction mixture. The product layer is washed with an acid, such as hydrochloric acid, then with water, and next with caustic, preferably ammonium hydroxide. The product layer is finally washed thoroughly with water, dried, preferably over anhydrous magnesium sulfate or potassium carbonate, filtered, stripped, and then, if desired, distilled. The resulting products are liquids that are useful as pesticides. They in addition may be reacted with dicyandiamide to yield products useful as protective coatings, particularly for metal. The present products may also be reacted with thioalcohols to form additives for lubricating oils.

The method of preparing the bis(cyanopentenoxy)alkanes according to the present invention is shown in the following illustrative examples in which parts by weight are used throughout.

*Example 1*

There were introduced into a three-neck two liter flask equipped with a nitrogen inlet, stirrer, thermometer, separator funnel, and condenser 98.6 parts of anhydrous cuprous cyanide and 300 parts of acetonitrile. While the mixture, which had been heated to 80° C., was stirred, 132.5 parts of bis(chloropentenoxy)ethane was added slowly over a period of three hours. During the addition of bis(chloropentenoxy)ethane the temperature of the mixture was maintained at 75° to 85° C. The reaction mixture was stirred and maintained in the temperature range of 75° to 85° C. for an additional two hours. At the end of that time 300 parts of ethylene dichloride was added to the reaction mixture. The reaction mixture was washed with a solution containing 200 parts of concentrated hydrochloric acid and 100 parts of water, and then the product layer was washed with two 200 part portions of water. The product layer was next washed with 200 parts of concentrated ammonium hydroxide and then with three 200 part portions of water. It was dried over anhydrous magnesium sulfate, filtered, stripped, and finally distilled. The product distilled at 200° to 210° C. at 1.7 mm., had a nitrogen content of 11.1% (11.3% theoretical), and a molecular weight of 245 (248 theoretical). The product was identified as bis(cyanopentenoxy)ethane.

*Example 2*

Into a three-neck two liter flask equipped with a nitrogen inlet, stirrer, thermometer, separator funnel, and Dry Ice-acetone condenser there were introduced 3 parts of cuprous chloride, 0.6 part of copper powder, 0.8 part of concentrated hydrochloric acid, 1.4 parts of potassium chloride, and 400 parts of water. The mixture was heated, while stirring, to 80° C. and there were then introduced 105 parts of finely powdered calcium carbonate and 200 parts of distilled water. The temperature was raised to 95° C. and then there were added 267 parts of bis(chloropentenoxy)ethane and 67 parts of hydrogen cyanide over a period of two and a quarter hours, during which time the temperature was maintained at 93° to 97° C. The mixture was held at the same temperature for two additional hours while stirring was continued. During this time carbon dioxide evolved and the hydrogen cyanide refluxed. At the conclusion of the reaction period the mixture was allowed to cool. Chloroform was added to the reaction mixture causing layer formation. The product layer was washed thoroughly with water and then dried over anhydrous magnesium sulfate. It was filtered, stripped, and finally distilled. The product distilled at 200° to 210° C. at 1.7 mm., had a nitrogen value of 11.1% (11.3% theoretical), and a molecular weight of 245±1 (248 theoretical). The product was identified as bis(cyanopentenoxy)ethane.

*Example 3*

A mixture of 3 parts of cuprous chloride, 0.6 part of copper powder, 0.8 part of concentrated hydrochloric acid, 1.4 parts of potassium chloride, and 400 parts of distilled water was added to a reaction vessel and heated to 80° C. There were then introduced 105 parts of finely powdered calcium carbonate and 200 parts of distilled water. The temperature of the system was raised to 95° to 97° C. and held at that level while 281 parts of bis(chloropentenoxy)propane and 65 parts of hydrogen cyanide were slowly introduced over a two hour period. The mixture was held at 92° to 98° C. for an additional two hours during which time carbon dioxide evolved and the hydrogen cyanide refluxed. At the end of the reaction period the mixture was allowed to cool and then 300 parts of chloroform was added. The chloroform addition caused layer formation. The product layer was washed with water and then dried over anhydrous magnesium sulfate. It was filtered, stripped, and finally distilled. The product distilled at 210° to 216° C. at 2.6 mm. It contained 10.4% nitrogen (10.6% theoretical) and had a molecular weight of 257±3 (262 theoretical). The product was identified as bis(cyanopentenoxy)propane.

*Example 4*

There was introduced into a reaction vessel 140.5 parts of bis(chloropentenoxy)propane. To this there were slowly added 98.6 parts of anhydrous cuprous cyanide and 300 parts of acetonitrile over a period of four hours. The mixture was heated to 80° C. and maintained in the range of 75° to 85° C. during the reaction time. After all of the components were present in the reaction mixture the reaction was continued for two additional hours and then the mixture was cooled. At the end of that time 300 parts of ethylene dichloride was added to the reaction mixture and the mixture was washed with strong hydrochloric acid. The product layer was then washed with water, concentrated ammonium hydroxide, and finally with water again. It was dried over anhydrous magnesium sulfate, filtered, stripped, and distilled. The product distilled at 211° to 216° C. at 2.6 mm., had a nitrogen content of 10.3% (10.6% theoretical) and a molecular weight of 257±3 (262 theoretical). The product was identified as bis(cyanopentenoxy)propane.

The same product was obtained by using bis(bromopentenoxy)propane as the starting compound instead of bis(chloropentenoxy)propane.

*Example 5*

There was added to a reaction vessel 147.5 parts of bis(chloropentenoxy)butane. Over a period of two hours there were slowly added 55 parts of anhydrous sodium cyanide and 300 parts of acetonitrile. The temperature of the system was maintained at 78° to 87° C. during the addition of sodium cyanide and for two hours thereafter. The reaction mixture was allowed to cool. There was then added 300 parts of ethylene dichloride to the reaction mixture and the mixture was washed with strong hydrochloric acid. The product layer was then washed with water, concentrated ammonium hydroxide, and then with water again. The product layer was then dried over anhydrous magnesium sulfate, filtered, stripped, and distilled. The product was identified as bis(cyanopentenoxy)butane.

*Example 6*

Into a reaction vessel containing 161.5 parts of bis(chloropentenoxy)hexane there were slowly introduced over a period of one hour 70 parts of anhydrous potassium cyanide and 300 parts of acetonitrile. During this time and for two and a half hours thereafter the temperature of the system was maintained at 76° to 89° C. At the end of the reaction, the mixture was allowed to cool and then 300 parts of ethylene dichloride were introduced. The reaction mixture was washed with strong hydrochloric acid. The product layer was then washed with water, concentrated ammonium hydroxide, and then again with water. The product layer was dried over anhydrous magnesium sulfate, filtered, stripped, and distilled. The product was identified as bis(cyanopentenoxy)hexane.

The same product was obtained by using bis(bromopentenoxy)hexane as the starting compound instead of bis(chloropentenoxy)hexane.

*Example 7*

There was added to a reaction vessel 175.5 parts of bis(chloropentenoxy)octane. To this there were introduced slowly over a period of one and a half hours 98.6 parts of anhydrous cuprous chloride and 300 parts of acetonitrile. During this addition and for three hours thereafter the temperature was maintained in the range of 75° to 85° C. At the end of the reaction period the mixture was allowed to cool. Ethylene dichloride was introduced into the mixture and the mixture was washed with strong hydrochloric acid. The product layer was then washed with water, concentrated ammonium hydroxide, and then with water again. The product layer was dried over anhydrous magnesium sulfate, filtered, stripped, and distilled. The product was identified as bis(cyanopentenoxy)octane.

We claim:

1. A method for preparing bis(cyanopentenoxy)alkanes which comprises reacting compounds having the formula $(XCH_2CH=CHCH_2CH_2O)_2R$, in which X is a member of the class consisting of chlorine and bromine and R is an alkylene group of two to eight carbon atoms, with a cyanide donor compound having an inorganic monovalent cation in an inert aqueous solvent medium.

2. A method for preparing bis(cyanopentenoxy)alkanes which comprises reacting, at temperatures of 40° to 175° C. and pressures at least atmospheric in an inert solvent medium, compounds having the formula (XCH₂CH=CHCH₂CH₂O)₂R, in which X is a member of the class consisting of chlorine and bromine and R is an alkylene group of two to eight carbon atoms, with a cyanide donor compound having an inorganic monovalent cation in an inert aqueous solvent medium.

3. A method for preparing bis(cyanopentenoxy)alkanes which comprises reacting, at temperatures of 55° to 140° C. and pressures at least atmospheric in an inert solvent medium, compounds having the formula (XCH₂CH=CHCH₂CH₂O)₂R, in which X is a member of the class consisting of chlorine and bromine and R is an alkylene group of two to eight carbon atoms, with a cyanide donor compound having an inorganic monovalent cation in an inert aqueous solvent medium.

4. A method for preparing bis(cyanopentenoxy)alkanes which comprises reacting compounds having the formula (XCH₂CH=CHCH₂CH₂O)₂R, in which X is a member of the class consisting of chlorine and bromine and R is an alkylene group of two carbon atoms, with a cyanide donor compound having an inorganic monovalent cation in an inert aqueous solvent medium.

5. A method for preparing bis(cyanopentenoxy)alkanes which comprises reacting compounds having the formula (XCH₂CH=CHCH₂CH₂O)₂R, in which X is a member of the class consisting of chlorine and bromine and R is an alkylene group of three carbon atoms, with a cyanide donor compound having an inorganic monovalent cation in an inert aqueous solvent medium.

6. A method for preparing bis(cyanopentenoxy)alkanes which comprises reacting compounds having the formula (XCH₂CH=CHCH₂CH₂O)₂R, in which X is a member of the class consisting of chlorine and bromine and R is an alkylene group of four carbon atoms, with a cyanide donor compound having an inorganic monovalent cation in an inert aqueous solvent medium.

7. As new compositions of matter bis(cyanopentenoxy)alkanes having the formula $$(CNCH_2CH=CHCH_2CH_2O)_2R$$

in which R is an alkylene group of two to eight carbon atoms.

8. As a new composition of matter, bis(cyanopentenoxy)ethane having the formula $$(CNCH_2CH=CHCH_2CH_2O)_2C_2H_4$$

9. As new compositions of matter, bis(cyanopentenoxy)propanes having the formula $$(CNCH_2CH=CHCH_2CH_2O)_2C_3H_6$$

10. As new compositions of matter, bis(cyanopentenoxy)butanes having the formula $$(CNCH_2CH=CHCH_2CH_2O)_2C_4H_8$$

References Cited in the file of this patent

UNITED STATES PATENTS

| | | |
|---|---|---|
| 2,383,443 | Bruson | Aug. 28, 1945 |
| 2,401,607 | Bruson | June 4, 1946 |
| 2,425,360 | Allen et al. | Aug. 12, 1947 |